United States Patent [19]

Hansen

[11] Patent Number: 4,698,161

[45] Date of Patent: Oct. 6, 1987

[54] POLYMER BLEND FOR DISPERSION OF PARTICULATE MATERIALS IN AQUEOUS SYSTEMS

[75] Inventor: Gerald D. Hansen, Holicong, Pa.

[73] Assignee: Pony Industries, Inc., N.Y.

[21] Appl. No.: 812,547

[22] Filed: Dec. 23, 1985

Related U.S. Application Data

[63] Continuation-in-part of Ser. No. 749,616, Jun. 27, 1985, abandoned.

[51] Int. Cl.$^4$ .............................................. C02F 1/00
[52] U.S. Cl. .................................. 210/701; 210/698; 210/732; 210/733; 210/734; 524/501; 525/205; 525/206; 525/207
[58] Field of Search ............... 210/698, 701, 732, 733, 210/734

[56] References Cited

U.S. PATENT DOCUMENTS 4,374,733 2/1983 Snyder et al. ...................... 210/698
4,384,979 5/1983 Hansen ................................ 210/701

*Primary Examiner*—Jacob Ziegler
*Attorney, Agent, or Firm*—C. R. Reap; A. J. Good; R. Laddie Taylor

[57] ABSTRACT

Particulate materials in aqueous media such as heat exchange systems are dispersed by introducing into the system a polymer blend comprising about 50 to 99% by weight of (A) a water-soluble, dissociating, low molecular weight polymer of at least one alpha, beta-monoethylenically unsaturated carboxylic acid, and about 50 to 1% by weight of (B) a water-soluble, dissociating, lower molecular weight polymer selected from (1) vinyl aromatic polymers and (2) polymers of 2-acrylamido-2-methylpropanesulfonic acid. A typical polymer blend comprises, in neutralized form, (A) polyacrylic acid terminated with thioglycolic acid and (B) a polymer of sulfonated styrene and maleic anhydride.

6 Claims, No Drawings

POLYMER BLEND FOR DISPERSION OF PARTICULATE MATERIALS IN AQUEOUS SYSTEMS

RELATED APPLICATION

This application is a continuation-in-part of application Ser. No. 749,616 filed June 27, 1985, abandoned.

BACKGROUND OF THE INVENTION

This invention relates to the dispersion of particulate materials in aqueous systems. More particularly, the invention concerns the dispersion of particulate solids in aqueous media to prevent deposition of the solids onto surfaces contacted by the media.

A continuing problem of industrial systems is the deposition of particulates from aqueous streams onto solid surfaces contacted by the streams, such as pipes, heat exchangers (for both heating and cooling), reactors, storage tanks, boilers, and the like. This condition is sometimes described as "fouling" and/or "scaling." The particulates may have a natural origin, such as silt, clays and other materials, both organic and inorganic, carried by rivers and streams. They may also constitute materials formed within an industrial system, which exceed the solubility limits of the system, such as scale, or materials added to a system, such as pigments, clay, starch, and other modifiers. Over time such materials will deposit on solid surfaces and cause constriction and/or reduced heat transfer, thereby leading to inefficient operation and eventual malfunctioning of a heat transfer or other system serviced by the aqueous medium.

The dispersion of inorganics such as kaolin-type clay minerals presents a special problem because studies have shown that the good adsorption of a dispersant material on the clay (which adsorption is a basic condition for dispersion of the clay particles) depends on the part of the clay crystal to which the dispersant molecule is attracted, whether or not the adsorption is single or multi-layered, and other more apparent considerations, such as polarity of the dispersion medium, temperature, and mobility of the system being treated. For example, kaolin clay crystal edges generally are more polar than the crystal surfaces; consequently, adsorption may occur more readily on the edges, depending on the polarity of the dispersant. Such adsorption is less favorable for dispersion than adsorption on crystal surfaces. Single layer adsorption is preferred over multi-layered adsorption, to avoid bridging between the crystals and weakening of the charge repulsion between the crystals (the maximization of which is the objective in dispersion). Accordingly, selection of a good dispersant for clay minerals is a highly empirical art.

Low molecular weight polymers such as styrene-maleic anhydride polymers have been developed as dispersants in aqueous heat exchange systems, as described, for example, in U.S. Pat. Nos. 2,723,956, 3,948,792, 4,288,327 and 4,374,733.

In scale formation calcium salts are precipitated, often accompanied by oxidation and other forms of corrosion of metal surfaces. U.S. Pat. No. 4,328,180 to G. D. Hansen and its division, U.S. 4,384,979, describe formulations useful for such purposes, including the use of a low molecular weight polymer of acrylic acid, terminated by thioglycolic acid. The latter material is more particularly described, with synthesis and use as a scale inhibitor, in U.S. Pat. No. 3,665,035 and its division 3,756,257, both to Rice et al.

Despite the efficacy of the compositions disclosed in the foregoing patents for control of corrosion of metal surfaces in contact with cooling or for control of deposition of materials from various aqueous systems, there remains a need in these and other areas of water treatment for enhancement of the dispersion of particulate materials, particularly of kaolin-type clay minerals, and thereby to prevent deposition onto surfaces of industrial systems. "Dispersion" in the context of this invention means maximizing the repulsion between solid particles in an aqueous system, resulting in reduced deposition of particulate matter on surfaces in contact with aqueous systems. The improved dispersion is sometimes evidenced by improved suspension of the particulates but can also result in solubilization, emulsification or other liquefaction.

SUMMARY OF THE INVENTION

Accordingly, it has now been found that a blend of two different polymers provides enhanced dispersion of particulate materials in aqueous media. The polymer blend of the invention comprises about 50 to 99% by weight of (A) a water-soluble, low molecular weight polymer of at least one alpha, betamonoethylenically unsaturated carboxylic acid and, optionally, other monomers, and about 50 to 1% by weight of (B) a water-soluble, low molecular weight polymer selected from (1) vinyl aromatic polymers and (2) polymers of 2-acrylamido-2-methylpropanesulfonic acid.

DETAILED DESCRIPTION

Polymer (A) of the polymer blend is a low molecular weight, for example, about 500 to 5000 (number average), preferably about 1000 to 2000, polymer of at least one alpha, beta -monoethylenically unsaturated carboxylic acid. The polymer is water soluble and dissociable in the aqueous medium. Typically, these polymers are based on addition polymerizable acids such as acrylic, methacrylic, and itaconic or crotonic acid, and any mixtures of two or more thereof. The polymers are terminated with groups which will aid in water solubility, such as bisulfite, mercapto or thioglycolic groups. The presence in the polymer of alkyl and other hydrophobic groups is permissible provided the polymers are sufficiently hydrolyzed or neutralized (either prior to addition to the system under treatment, or in situ during treatment) and dissociable. Accordingly, the polymers include copolymers of at least one of the aforementioned polymerizable acids and minor amounts (0 to about 40 wt. % on total Polymer A) of at least one other non-acid monomer, such as a lower alkyl acrylate, e.g., methyl or ethyl acrylate, and terminated and hydrolyzed or neutralized as indicated.

A preferred polymer (A) is polyacrylic acid terminated by thioglycolic acid, disclosed in the Rice et al patents cited above and incorporated herein by reference. By substituting an alkyl mercaptan, such as ethyl or propyl mercaptan, for the thioglycolic acid terminating agent in the sntheses of the Rice et al patents, generally equivalent mercaptan terminated acrylic polymers are formed. Useful bisulfite terminated polymers are described in U.S. Pat. No. 3,965,028 to O'Brien et al. This patent, incorporated herein by reference, discloses low molecular weight, water-soluble polymers of acrylic acid alone or with acrylonitrile or methyl acrylate terminated with an alkali metal bisulfite and rendered more water soluble by neutralization with a base such as NaOH or NH4OH.

Polymer (B) of the blend is a water-soluble, low molecular weight, dissociable, vinyl aromatic polymer or a polymer of 2-acrylamido-2-methylpropanesulfonic-sulfonic acid. These polymers generally have molecular weights of about 500 to 5000 (number average), preferably about 1000 to 3000. The vinyl aromatic polymers (sometimes also called "styrenic" or "styrene-containing" polymers) are based on styrene and substituted styrenes such as vinyl toluene or alpha-methyl styrene, and include sulfonated polystyrene, sulfonated styrene-divinyl benzene copolymers, hydrolyzable sulfonated styrene-maleic anhydride copolymers, hydrolyzable sulfonated styrene-maleic anhydride copolymers, hydrolyzable styrene-maleimide copolymers, hydrolyzable sulfonated styrene-maleimide copolymers, and the like. The molar ratio of vinyl aromatic monomer to maleic anhydride or other comonomer generally is about 1:1 to about 10:1, preferably about 1:1 to 4:1. The polymers are rendered water-soluble by neutralization with a base such as sodium hydroxide, potassium hydroxide, an alkyl amine or ammonia.

The 2-acrylamido-2-methylpropanesulfonic acid may be used as homopolymer or as a copolymer with up to 50 wt. % on total Polymer B of at least one other water-soluble monomer, such as acrylamide, acrylic acid, acrylonitrile, maleic anhydride, N-vinylpyrrolidone, 4-vinylpyridine, 3-methacrylamidopropyldimethylamine, N,N-dimethylaminoethyl methacrylate, hydroxyethyl acrylate and butoxyethyl acrylate.

While specific molecular weight ranges and degrees of neutralization of polymers (A) and (B) have been described, such ranges are merely representative of those useful for obtaining sufficient water solubility and are not critical in the invention.

As indicated, the polymer blends are effective dispersants of particulate materials in aqueous systems when the proportions of polymers (A) and (B) are about 50 to 99% by weight and about 50 to 1% by weight, preferably about 70 to 90% by weight and about 30 to 5% by weight, respectively. The polymers may be added in dry form to the aqueous medium to be treated or one or both polymers may first be dissolved and then added to the aqueous system, for example, as about 5 to 80 wt. %, preferably about 30 to 60 wt. %, polymer concentrate solutions, to obtain the requisite polymer proportions. Those polymers requiring hydrolysis may be hydrolyzed prior to forming the polymer blend, or non-hydrolyzed forms may be used, with hydrolysis effected in situ in the aqueous system under treatment. The total amount of polymer concentrate added to the aqueous system will be such as to maintain use concentrations tailored to the system being treated. Total polymer use concentrations of 1 to 80 ppm in cooling tower water is generally effective, but other concentrations may be determined by routine trials for each system. Addition to a specific system may be, of course, batchwise or continuous, accompanied by occasional or continuous monitoring of polymer concentration relative to deposition experience.

Other ingredients known in water treatment optionally may be formulated with the polymer blend or added separately to the aqueous system treated with the blend. These include pH adjusting or regulating agents such as acids or alkalis and buffers such as water-soluble silicates; antifoaming agents; ionic or nonionic surfactants such as sodium dioctyl sulfosuccinate and sodium dixphenoxy disulfonate; solubilizers for scale-forming metal salts and hydroxides such as tar-taric acid; and various corrosion inhibitors such as nitrates, nitrites, sodium or potassium phosphates (sodium hydrogen phosphate, sodium tripolyphosphate, etc.), organic phosphonates (diphosphonates, triphosphonates, tetraphosphonates, etc.), and phosphate esters (sodium salt of phosphate ester of tetraethylene glycol), and the like, including any combinations thereof.

The following nonlimiting examples will further illustrate the invention.

EXAMPLE 1

A clay mineral identified as Georgia Kaolin Hydrite R having a surface area of 14.12 $m^2/g$ is washed and dried to reduce background absorbence and is then dispersed in deionized water to provide a 10% by weight slurry. The pH of the slurry is 5.03 and is adjusted to 7–8 by addition of carbonate-free NaOH. Separate polymer solutions of (A) a thioglycolic acid terminated acrylic acid polymer of 2800 molecular weight (number average), 1.57 degree of dispersity, 100% neutralized with NaOH, and (B) a hydrolyzed, sulfonated styrene-maleic anhydride polymer of about 1,000 molecular weight (number average), are prepared in distilled water. To 100 ml samples of the 10% clay slurry are added solutions of polymer (A) or polymer (B) to provide 10, 20, 30, 40, 60 and 80 ppm active polymer. To other 100 ml samples of the 10% clay slurry are added 95/5 and 87.5/12.5 blends of polymers (A) and (B). After the clay slurry/polymer compositions are stirred for 30 minutes at selected temperatures, the compositions are filtered through a 0.45 micron membrane filter and then through a 0.22 micron membrane filter. The amount of polymer remaining in the filtrate is determined in the case of the styrene-maleic anhydride polymer samples by UV adsorption and reference to a standard curve. The amount of acrylic acid polymer remaining in the filtrate is determined by chloroform extraction of mixture of polymer containing methylene blue and reference to a standard curve. The difference between the amount of polymer added to the clay slurry and the amount in the filtrate is taken as the amount of polymer adsorbed on the clay.

The results of the experiments are summarized in Table I from which it will be noted that adsorption of the styrene-maleic anhydride polymer on the clay is relatively high at low polymer concentration, accompanied by a marked drop-off in rate of adsorption as the polymer concentration is increased. The data also show a lower rate of adsorption of the acrylic acid polymer than the styrene-maleic anhydride polymer at lower concentrations, but a higher rate of adsorption at the medium and higher concentrations. By comparison, the polymer mixtures indicate a more uniform rate of adsorption at the same total polymer concentrations as the single polymer additions. Consequently, adsorption of the polymer blends on the clay is improved over that afforded by the same amount of each of the polymers individually, especially at total polymer use concentrations of about 20 to 40 ppm at the test temperatures. By suitable change in selection and proportion of the polymers in the blend, similar improvements can be shown at other use concentrations and temperatures.

While not fully understood, it is believed that the improved adsorption exhibited at the lower use concentrations represents adsorption on the more polar crystal edges of the kaolin clay whereas the test results at the intermediate concentrations represent adsorption of the polymers on the faces of the clay crystals. Adsorption at the higher concentrations is believed to represent adsorption of multilayers of polymer on polymer adsorbed to crystal faces, an undesirable effect. However, since interaction between clay crystals and solvent in aglomeration is known to comprise both edge and surface interactions, the more complete adsorption of a surface charge modification is believed to account for the improved dispersion of the clay by the polymer blends.

hydrolyzable styrene/maleic anhydride copolymer, hydrolyzable sulfonated styrene/maleic anhydride copolymer, hydrolyzable styrene/maleimide copolymer, hydrolyzable sulfonated styrene/maleimide copolymer, sulfonated polystyrene, and copolymers of sulfonated styrene and divinyl benezene, and polymers (2) are selected from the group consisting of homopolymers of 2-acrylamido-2-methylpropane sulfonic acid and copolymers of 2 acrylamido-2-methylpropane sulfonic acid and at least one water soluble comonomer.

TABLE I

| | | Adsorption of Polymers on Kaolin | | | | | | | | | |
|---|---|---|---|---|---|---|---|---|---|---|---|
| | Polymer | At 15° C. (ppm) | | | | At 25° C. (ppm) | | | At 35° C. (ppm) | | |
| Run No. | Amount (ppm) | A | B | A + B 95/5 | A + B 87.5/12.5 | A | B | A + B 87.5/12.5 | A | B | A + B 95/5 | A + B 87.5/12.5 |
| Control | 0 | 0 | 0 | 0 | 0 | 0 | 0 | 0 | 0 | 0 | 0 | 0 |
| 1 | 10 | 3 | 10 | 9 | 4 | 3.5 | 10 | 4 | 7 | 10 | 9.5 | 5 |
| 2 | 20 | 2 | 12.5 | 18.5 | 13.5 | 7 | 17.5 | 15 | 14 | 14 | 19.5 | 14 |
| 3 | 30 | 6 | — | 28.9 | 23 | 22 | — | 24.5 | 22 | — | 28.2 | 24.5 |
| 4 | 40 | 27 | 25 | 37.4 | 33 | 32 | 27 | 32 | 33 | 31 | 36.04 | 32 |
| 5 | 60 | 55 | — | 54.6 | 48 | 55 | — | 50 | 56.5 | — | 54.6 | 51 |
| 6 | 80 | 77.5 | 41 | 72.3 | 69 | 77.5 | 44 | 69 | 77.5 | 43 | 72.3 | 68 |

Polymer A: Thioglycolic acid terminated acrylic acid polymer.
Polymer B: Hydrolyzed, sulfonated styrene-maleic anhydride polymer.

I claim:

1. A method of dispersing particulate materials in an aqueous medium, which comprises introducing into the medium an amount effective to disperse said materials of a polymer blend consisting essentially of about 50 to 90% by weight of (A) a polyacrylic acid terminated by thioglycolic, bisulfite, or mercapto groups and about 50 to 1% by weight of (B) a water-soluble, dissociating low molecular weight polymer selected from the group consisting of (1) vinyl aromatic polymers and (2) polymers of 2-acrylamido-2-methylpropane sulfonic acid.

2. The method of claim 1 wherein the vinyl aromatic polymers (1) are selected from the group consisting of 3. The method of claim 1 wherein the amount of polymer (A) is about 70 to 95% by weight and the amount of polymer (B) is about 30 to 5% by weight.

4. The method of claim 1 wherein polymer (B) is a hydrolyzable polymer of sulfonated styrene and maleic anhydride.

5. The method of claim 4 wherein the amount of polymer (A) is about 70 to 95% by weight and the amount of polymer (B) is about 30 to 5% by weight.

6. The method of claim 1 wherein the number average molecular weight of polymers (A) and (B) is about 500 to 5000.

* * * * *